United States Patent [19]

Mellen

[11] Patent Number: 4,865,068
[45] Date of Patent: Sep. 12, 1989

[54] BLEED CONTROL APPARATUS FOR A FLUID CONVEYING SYSTEM

[76] Inventor: Floyd F. Mellen, 8417 Pacific St., Omaha, Nebr. 68124

[21] Appl. No.: 194,546

[22] Filed: May 16, 1988

[51] Int. Cl.$^4$ .............................................. F16K 17/34
[52] U.S. Cl. .................................... 137/114; 137/117; 417/299; 417/300
[58] Field of Search ....................... 137/114, 117, 497; 417/299, 300; 251/318, 319, 320, 321

[56] References Cited

U.S. PATENT DOCUMENTS

| | | | |
|---|---|---|---|
| 430,160 | 6/1890 | Williams | 251/329 X |
| 995,057 | 6/1911 | Cowles | 417/299 X |
| 2,152,695 | 4/1939 | Hornschuch | 137/117 |
| 2,982,514 | 5/1961 | Bryant | 251/329 |
| 3,685,530 | 8/1972 | Bailey | 137/117 X |
| 3,763,891 | 10/1973 | Stiltner | 251/325 X |

FOREIGN PATENT DOCUMENTS 1108992 6/1961 Fed. Rep. of Germany ...... 137/117

Primary Examiner—Stephen Hepperle
Attorney, Agent, or Firm—John A. Beehner

[57] ABSTRACT

A self contained mechanical bleed control apparatus for a fluid conveying system, such as a central vacuum system or a pressurized air system, includes a slide member housing which slidably supports an orifice plate having an air foil on one end disposed within a main flow conduit just upstream from a vacuum producer or downstream from the compressor in a pressurized fluid system. A source of bleed fluid communicates with the slide member housing and is valved by movement of the orifice plate. The orifice plate is biased to a position for communication of bleed fluid into the main conduit under low flow conditions. Increased flow through the main conduit acts on the air foil to slide the orifice plate against the urging of the biasing force to cut off the bleed fluid supply.

15 Claims, 4 Drawing Sheets

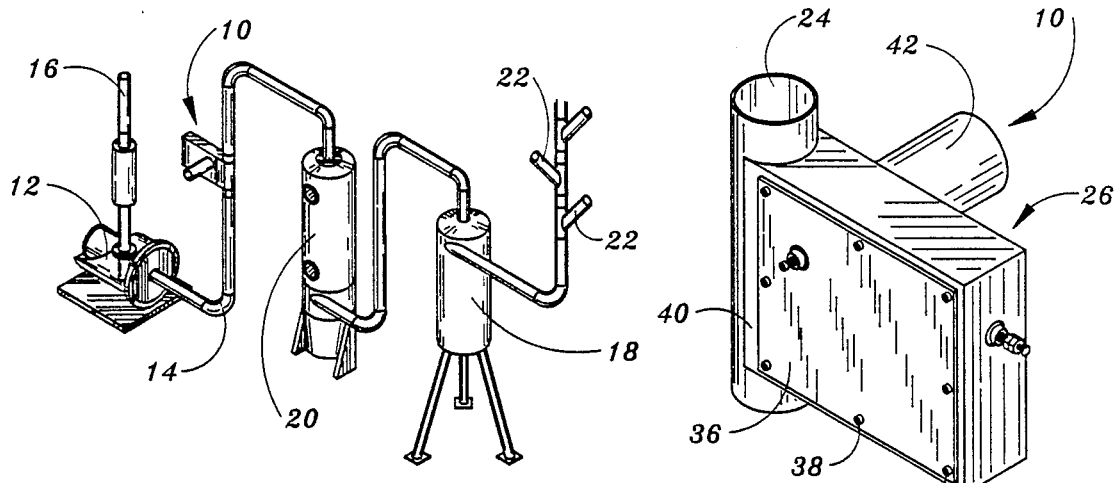
FIG. 1
FIG. 2
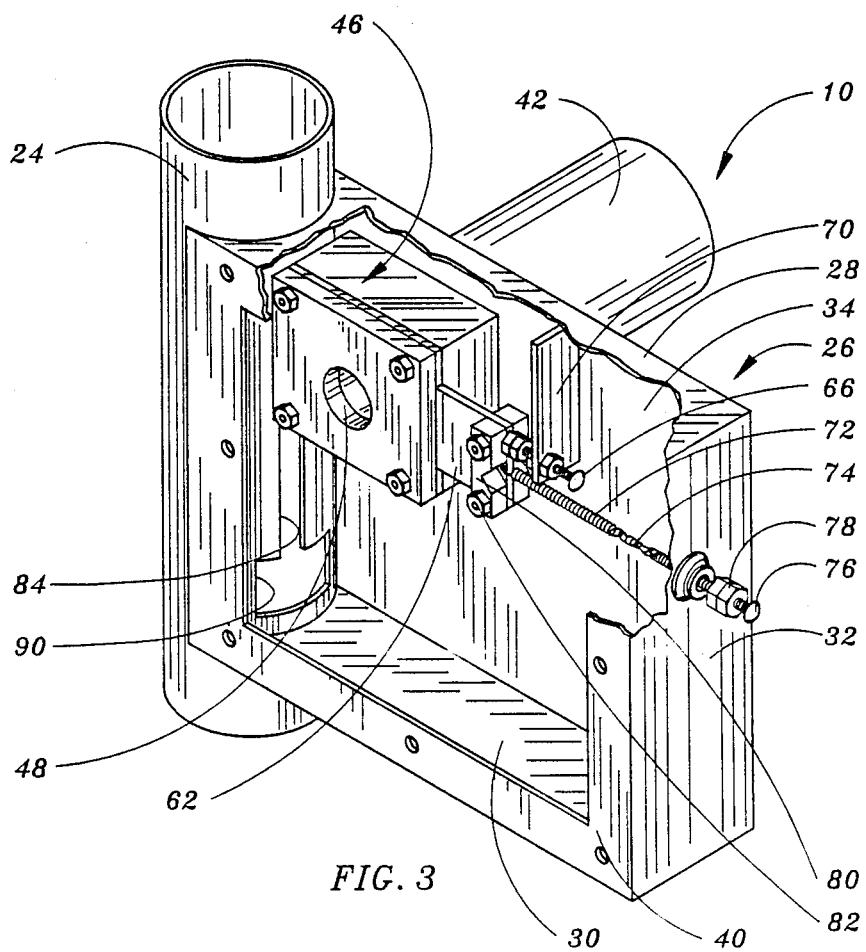
FIG. 3

1

BLEED CONTROL APPARATUS FOR A FLUID CONVEYING SYSTEM

BACKGROUND OF THE INVENTION

The present invention is directed generally to a bleed control apparatus for fluid conveying systems and more particularly to such an apparatus for eliminating the problem of surging in vacuum air systems and pressurized air systems.

Fluid conveying systems such as central vacuum systems for large commercial or industrial buildings or pressurized air systems for industry or waste water treatment plants experience a problem of surging in low flow situations. Surging is reverse flow of fluid in the system and is related to the piping system geometry. The surging problem may be solved by providing an air bleed in the system just upstream of the vacuum producer or just downstream from a compressor to allow additional air into the system, thereby to maintain air flow at a level above the surge limit and to prevent excessive heating of discharge air.

A flow actuated bleed valve was previously disclosed in Bailey U.S. Pat. No. 3,685,530. Whereas that valve was likewise designed to eliminate surging, it was somewhat cumbersome, requiring a long rotary movement of a valve paddle and experienced servicing problems relating to adjustment and access.

The alternative has been to provide a substantially more expensive electronic bleed control system which likewise requires expensive specialized service and which is cost prohibitive for many installations.

A primary object of the present invention therefor is to provide an improved bleed control apparatus for a fluid conveying system, Another object is to provide a bleed control apparatus which is a self-contained flow actuated valve.

Another object is to provide a bleed control apparatus in which the valve member is of simple construction, minimizes interference with flow through the conduit on which it is mounted and may be quickly and easily installed in and removed from the apparatus.

Another object of the invention is to provide a bleed control apparatus which is externally adjustable for varying valve spring tension and orifice opening size.

Another object of the invention is to provide a bleed control apparatus which is simple and rugged in construction, economical to manufacture and efficient in operation.

SUMMARY OF THE INVENTION

The bleed control apparatus of the present invention is a self-contained unit which may be interposed along the main fluid conduit of a fluid conveying system just upstream from the vacuum producer in a vacuum system or downstream of the compressor in a pressurized fluid system. A main conduit insert has a bleed opening and slide member slot through the sidewall thereof. A slide member housing is mounted on the main conduit insert at the slide member slot and has a bleed orifice through it. A slide member is linearly slidable in the housing and likewise has a bleed orifice alignable with housing bleed orifice. An air foil is mounted on the forward end of the slide member at a position within the main conduit and a spring biases the slide member in a direction toward a position of alignment of the bleed orifices of the slide member and housing. The air foil is of a size and inclination such that fluid flow through the main conduit causes linear movement of the slide member against the urging of the return spring to effect a misalignment of the bleed orifices and thus a blockage of the flow of bleed air into the system in high flow conditions.

Stop means limit the extent of movement of the slide member in both directions and such stop means may be adjustable to vary the orifice opening size. The tension of the return spring may be adjustable and a swivel is preferably coupled with the spring to eliminate twisting which undesirably affects spring tension. The spring tension adjustment is preferably readily accessible externally of the unit as is an orifice adjustment member.

The slide member housing and main conduit bleed opening are enclosed within a cabinet provided with an access door. The slide member slot opens into the bleed opening so that the bleed opening performs the dual function of enabling insertion and removal of the air foil into and from the main conduit quickly and conveniently and without any need for removing the installed cabinet from the system.

BRIEF DESCRIPTION OF THE DRAWINGS

FIG. 1 is a perspective view of a portion of a central vacuum system including the bleed control apparatus of the invention;

FIG. 2 is a perspective view of the bleed control apparatus;

FIG. 3 is an enlarged perspective view of the bleed control apparatus with the cover plate removed and portions broken away for clarity;

DESCRIPTION OF THE PREFERRED EMBODIMENT

Figure 4:
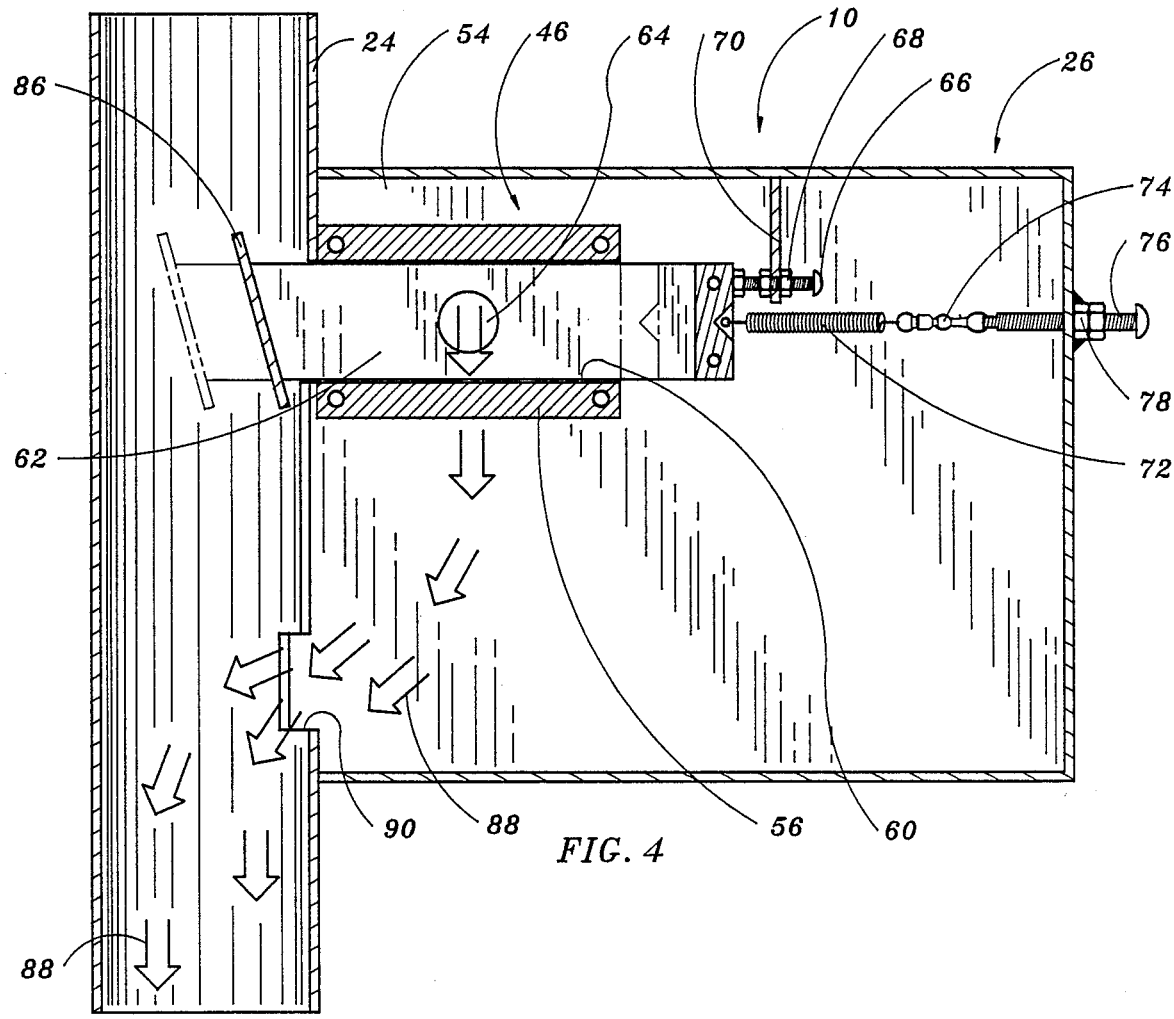
FIG. 4 is an enlarged side sectional view of the bleed control apparatus.

The bleed control apparatus 10 of the present invention is shown in FIG. 1 as installed in a central vacuum system which includes a vacuum producer 12 connected to the system piping 14 and an exhaust pipe 16. First and second separators 18 and 20 are interposed along the system piping just upstream of the vacuum producer for separating dirt and debris from the air drawn in from the vacuum outlet tubes 22.

Referring to FIGS. 2 and 3, bleed control apparatus 10 includes an upstanding control tube 24 which is secured by conventional couplings into the system piping 14. It is preferable that the control tube be of slightly smaller diameter than the system piping 14 and that it be connected by an appropriate venturi-like coupling for increased velocity air flow through the control tube 24.

A cabinet 26 is secured to the control tube 24 and extends radially outwardly therefrom. Cabinet 26 includes top and bottom walls 28 and 30, and end wall 32, a back wall 34 and a removable front cover plate 36. Cover plate 36 may be secured in place by a plurality of bolts 38 which are inserted through the cover plate and into aligned holes in a peripheral flange on the front face of the cabinet. A gasket or the like may be interposed between the cover plate 36 and flange 40 for an air-tight seal. The air bleed tube 42 opens through back wall 34.

The cabinet back wall 34 has an orifice 44 in communication with the air bleed tube 42. A slide member housing 46 is supported on the interior side of cabinet back wall 34 at a position such that an orifice 48 through the slide member housing 46 is aligned with the back wall orifice 44 for communication with the air bleed tube 42. Housing 46 includes a relatively thick back plate 50, a thinner front plate 52 and a pair of spacer plates 54 and 56 (FIGS. 4 and 6) which are secured together and to back wall 34 by a plurality of through bolts 58.

The slide member housing 46 thus defines an elongated sleeve 60 which is substantially filled by a slide member or orifice plate 62 which is free to slide back and forth in the housing. The housing 46 may be constructed of any of the new commercially available low friction plastics. One such material is Ultra High Molecular Weight Polyethylene sold under the POLY-HI name by Menasha Corporation of Fort Wayne, Indiana. This material is high in abrasion and impact resistance but low in coefficient of friction. The slide member or orifice plate 62 may be formed of any smooth surfaced material such as stainless steel.

Figure 5:
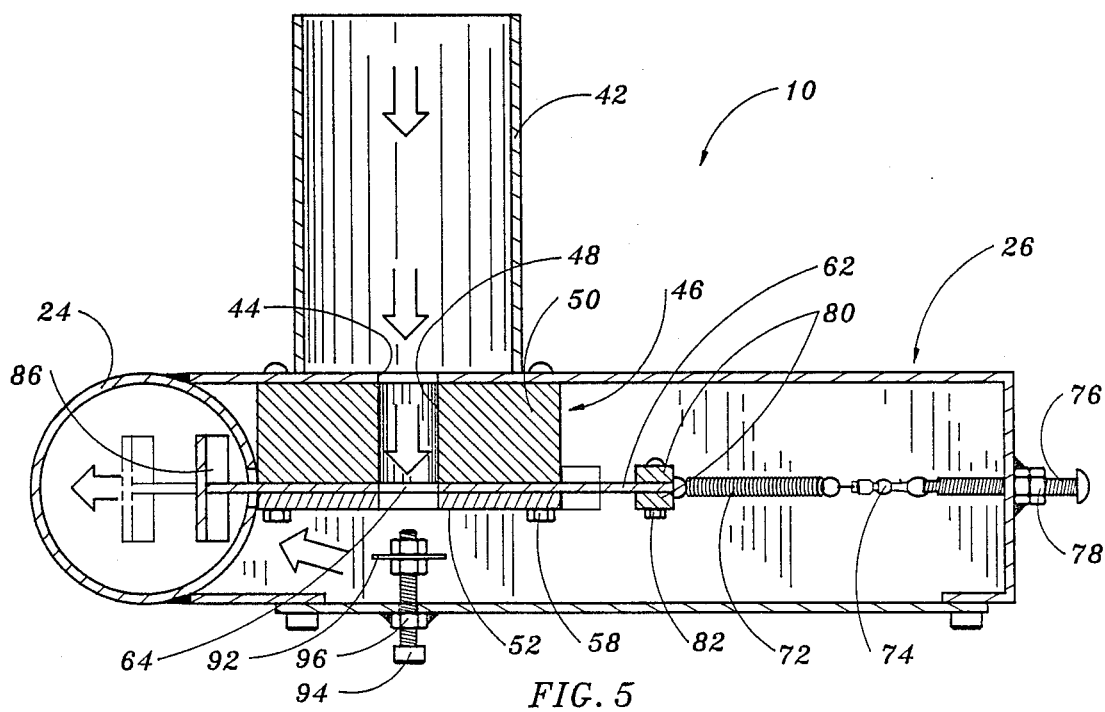
FIG. 5 is a top sectional view of the bleed control apparatus.

Orifice plate 62 has an orifice 64 formed through it at a position for alignment with slide member housing orifice 48 upon movement of the orifice plate to the adjusted retracted position illustrated in FIGS. 4 and 5. An adjustment screw 66 (FIG. 4) is supported by a nut 68 on a depending flange 70 secured to top wall 28 and back wall 34 for fixing the retracted stop position for the orifice plate 62. The illustrated position shows the orifices 64 and 48 aligned for maximum air flow.

The orifice plate 62 is urged toward the retracted stop position by a tension spring 72 having one end connected to the orifice plate and an opposite end connected by a swivel connector 74 to a tension adjustment screw 76 which is extended through the cabinet end wall 32 and secured with a nut 78. The swivel connector may be of the type commonly used for connecting fishing lures to a line. The swivel prevents twisting of the spring 72 which could unintentionally effect the spring tension.

Movement of the orifice plate 62 in the opposite direction to extended position is limited by engagement of a pair of stop plates 80 with the slide member housing 46. The stop plates are secured to opposite sides of the interior end of the orifice plate 62 by bolts 82. Upon movement of the orifice plate 62 to a fully extended position with the stop plates 80 in engagement with the housing 46, the orifice plate orifice 64 is fully displaced from the housing orifice 48 so as to substantially cut off fluid flow between them.

Figure 6:
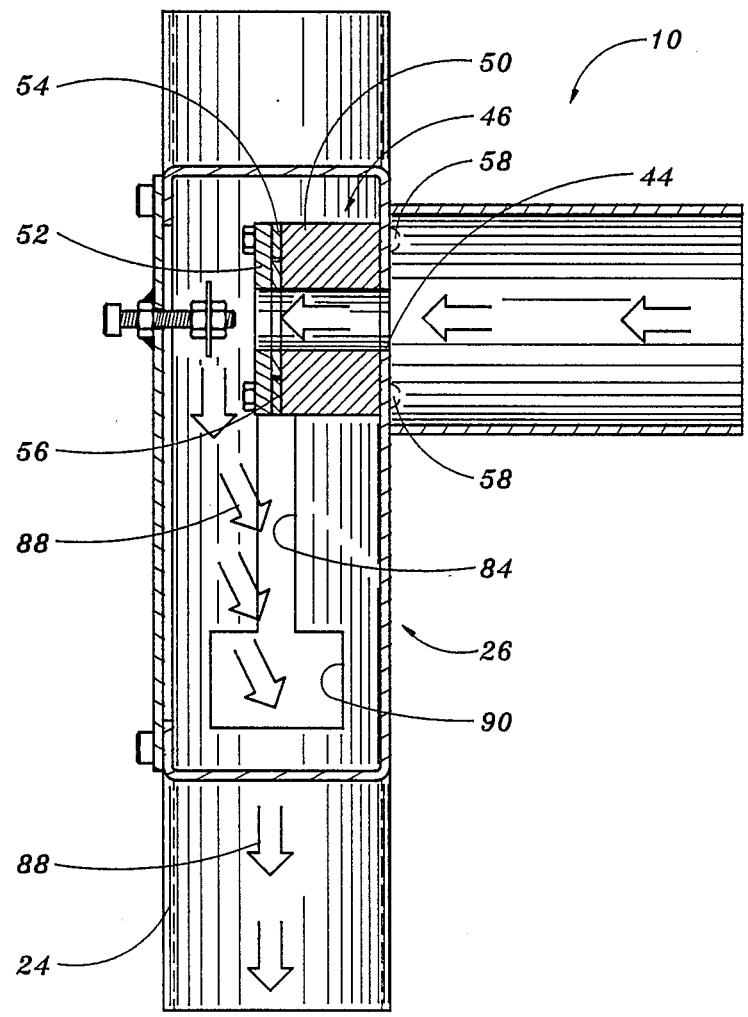
FIG. 6 is an end sectional view thereof.

The opposite or exterior end of orifice plate 62 is disposed within the control tube 24 since it extends through the upper end of an elongated upright slide member slot 84, as shown best in FIGS. 3 and 6. The air foil 86 is mounted on the end of the orifice plate 62 within the control tube 24 to control movement of the orifice plate 62 in response to air flow through control tube 24.

Air foil 86 is inclined relative to the axis of control tube 24, as illustrated in FIG. 4 for a central vacuum system, such that a downward air flow through the control tube 24 impinges on the air foil 86 and causes it to move further into the control tube toward an extended position against the urging of tension spring 72.

Thus in high flow conditions, such as when several vacuum outlets are in use, the orifice plate 62 is moved leftward in FIG. 4 to a fully extended position wherein orifice 64 is completely displaced from housing orifice 48 to close off the supply of bleed air through bleed tube 42. In low flow conditions, however, such as when only one or none of the vacuum outlets are in use, tension spring 72 is operative to retract the orifice plate 62 to at least partially align the orifices 64 and 48. Such alignment allows bleed air into the system along the air flow paths illustrated by arrows 88 in FIGS. 4 and 6 to prevent surging and damage to the vacuum producer.

Air flow through orifices 48 and 64 enters cabinet 26 which communicates with the control tube 24 through both the slide member slot 84 and an enlarged bleed port 90 through control tube 24 adjacent cabinet bottom wall 30. The size and shape of bleed port 90 is coordinated with the size and shape of the air foil 86 to permit insertion and removal of the air foil into and from control tube 24 through bleed port 90. Thus, removal or replacement of the orifice plate 62 can be accomplished simply by removal of the slide member housing screws 58 which allows the orifice plate 62 to be dropped down within slide member housing 46 for withdrawal of the air foil 86 through bleed port 90. No removal of cabinet 26 or control tube 24 from the system piping 14 is therefore required.

Whereas the air foil 86, as illustrated in the preferred embodiment, is a flat rectangular plate disposed at a ten degree angle of attack, the inclination relative to the axis of control tube 24, it may be of any other shape or configuration which is operative to horizontally lift the orifice plate 62 toward the extended position within control tube 24 in response to increased air flow. The illustrated air foil is preferred both for its structural simplicity and operational efficiency. It is believed to cause only minimal or inconsequential interference with air flow through the control tube while effectively valving the source of bleed air for efficient operation of the central vacuum system without surging.

The specific size, shape and angle of attack for the air foil are all variables which are related to the velocity of air flow through the control tube for a particular system. The air foil design is further coordinated with the specifications of spring 72 in order for orifice plate 62 to effectively valve the bleed air supply. In the illustrated embodiment, for example, spring 72 is a 25 gauge, 2½ inch long, 5/16 inch outer diameter spring having a rate of 0.09 pounds per inch, which therefore exerts a pulling force of approximately 1.44 ounces when extended.

Referring to FIGS. 2 and 5, the removable front cover plate 36 may additionally be provided with a bleed control disk 92 which is secured on the end of an adjustment screw 94 that is threaded through a nut 96 on cover plate 96 at a position in alignment with the housing orifice 48 to adjust the air flow through that orifice by movement of the disk 92 toward and away from housing front plate 52.

Figure 7:
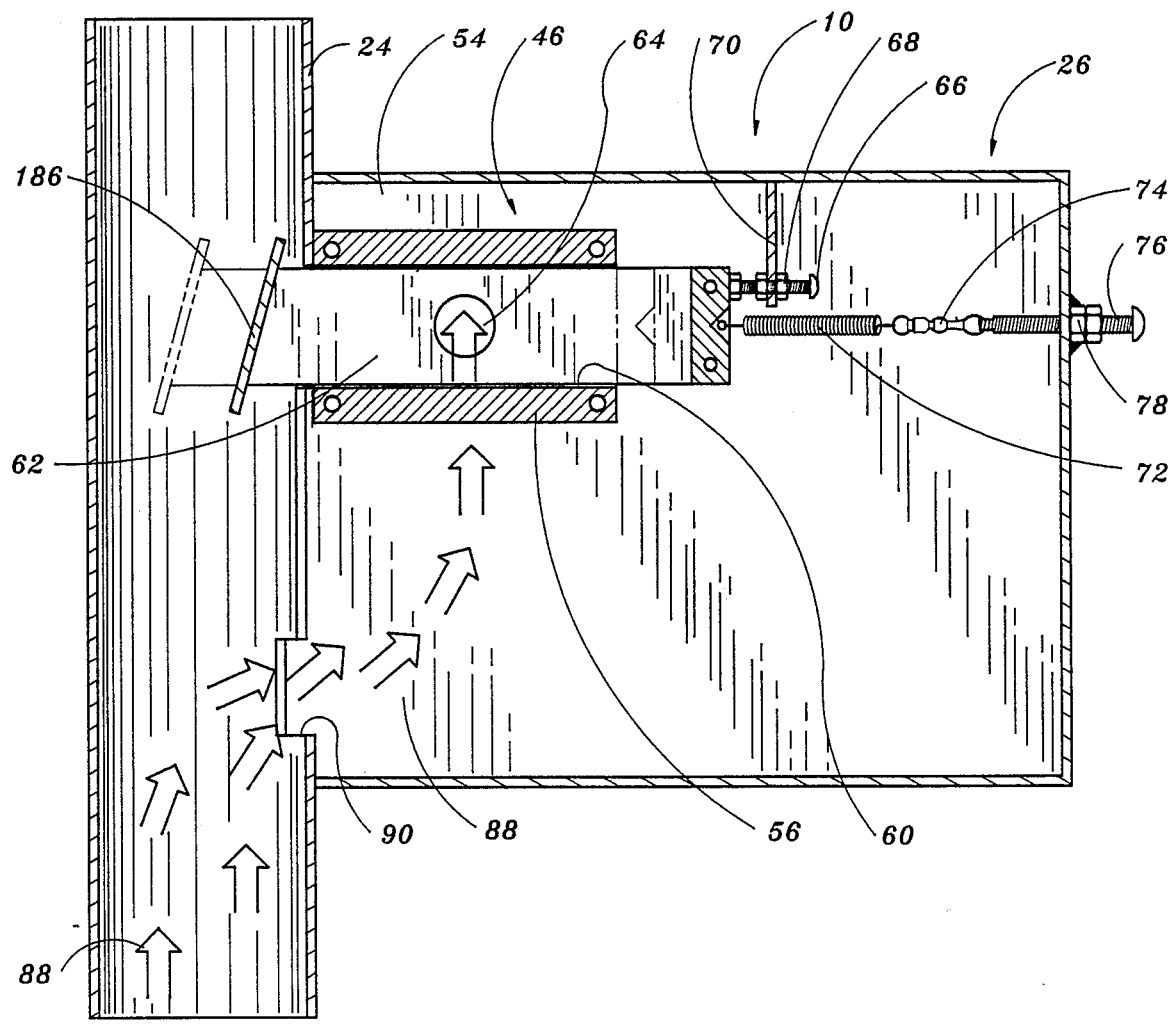
FIG. 7 is an enlarged side sectional view of the bleed control apparatus as modified for a pressurized air system.

FIG. 7 illustrates a second embodiment of the invention which is adapted for use in a pressurized air system. The apparatus of FIG. 7 is identical to that of the previous embodiment except that the orifice plate 62 is turned upside-down so that the air foil is oppositely inclined relative to the axis of control tube 24. Thus, in conditions of high air flow upwardly through control tube 24, that air flow impinges upon air foil 186 to draw the orifice plate 62 further into control tube 24 against the urging of spring 72 to misalign the orifices 64 and 48 and cut off the bleed air supply. Likewise, in conditions of low flow upwardly through control tube 24, surging and damage to the air compressor are prevented by retraction of orifice plate 62 by spring 72 which thereby aligns orifices 64 and 48 to provide an escape for air from the compressor outwardly through bleed tube 42.

As the invention has been shown and described herein in connection with preferred embodiment thereof, it is apparent that many modifications, additions, and substitutions may be made which are within the intended broad scope of the appended claims. The linear sliding movement of the orifice plate may be advantageously used in other applications as part of a gas flow indicator, liquid flow indicator, or safety shut-down switch.

Thus there has been shown and described a bleed control apparatus for a fluid conveying system which accomplishes at least all of the stated objects.

I claim:

1. A bleed control apparatus for an air conveying system including a main conduit having a sidewall, inlet end, outlet end and a bleed opening and slide member slot through said sidewall, said apparatus comprising,
   a slide member housing mounted on said main conduit at said slide member slot and defining a bleed orifice therethrough, said bleed orifice being in communication with the ambient atmosphere,
   a slide member slidably supported in said housing and having a forward end extending into said main conduit through said slide member slot, an opposite rearward end and a bleed orifice alignable with said housing bleed orifice,
   means for establishing fluid communication between said housing bleed orifice and said main conduit bleed opening upon alignment of the slide member bleed orifice with the housing bleed orifice,
   bias means urging said slide member in one direction toward a position of alignment of the slide member bleed orifice with the housing bleed orifice, and
   an air foil mounted on the forward end of said slide member within said main conduit and inclined relative to the axis of said main conduit such that fluid flow through said main conduit impinges on said air foil to urge said slide member in the opposite direction toward a position wherein said slide member orifice is moved out of alignment with said slide member housing orifice thereby blocking communication of bleed fluid to said main chamber.

2. The apparatus of claim 1 wherein said slide member comprises a flat plate.

3. The apparatus of claim 2 wherein said air foil comprises a flat plate.

4. The apparatus of claim 3 wherein said air foil has a generally rectangular shape.

5. The apparatus of claim 1 further comprising first stop means for limiting sliding movement of said slide member in said one direction of urging by said bias means.

6. The apparatus of claim 5 further comprising second stop means for limiting sliding movement of said slide member in said opposite direction.

7. The apparatus of claim 1 wherein said means for establishing fluid communication between said housing bleed orifice and said main conduit bleed opening comprises a cabinet mounted on said main conduit and enclosing said slide member housing and main conduit bleed opening.

8. The apparatus of claim 1 wherein said fluid conveying system comprises an air vacuum system.

9. The apparatus of claim 1 wherein said fluid conveying system comprises a pressurized air system.

10. A bleed control apparatus for a fluid conveying system including a main conduit having a sidewall, inlet end, outlet end and a bleed opening and slide member slot through said sidewall, said apparatus comprising,
    a slide member housing mounted on said main conduit at said slide member slot and defining a bleed orifice therethrough,
    a slide member slidably supported in said housing and having a forward end extending into said main conduit through said slide member slot, an opposite rearward end and a bleed orifice alignable with said housing bleed orifice,
    means for establishing fluid communication between said housing bleed orifice and said main conduit bleed opening upon alignment of the slide member bleed orifice with the housing bleed orifice,
    bias means urging said slide member in one direction toward a position of alignment of the slide member bleed orifice with the housing bleed orifice, and
    an air foil mounted on the forward end of said slide member within said main conduit and inclined relative to the axis of said main conduit such that fluid flow through said main conduit impinges on said air foil to urge said slide member in the opposite direction toward a position wherein said slide member orifice is moved out of alignment with said slide member housing orifice thereby blocking communication of bleed fluid to said main chamber,
    said slide member comprising a flat plate, and
    said slide member housing comprising a pair of plates on opposite sides of said slide member and spacer plates arranged above and below said slide member and between said pair of plates to define a sleeve for said slide member.

11. A bleed control apparatus for a fluid conveying system including a main conduit having a sidewall, inlet end, outlet end and a bleed opening and slide member slot through said sidewall, said apparatus comprising,
    a slide member housing mounted on said main conduit at said slide member slot and defining a bleed orifice therethrough,
    a slide member slidably supported in said housing and having a forward end extending into said main conduit through said slide member slot, an opposite rearward end and a bleed orifice alignable with said housing bleed orifice,
    means for establishing fluid communication between said housing bleed orifice and said main conduit bleed opening upon alignment of the slide member bleed orifice with the housing bleed orifice,
    bias means urging said slide member in one direction toward a position of alignment of the slide member bleed orifice with the housing bleed orifice, and
    an air foil mounted on the forward end of said slide member within said main conduit and inclined relative to the axis of said main conduit such that fluid flow through said main conduit impinges on said air foil to urge said slide member in the opposite direction toward a position wherein said slide member orifice is moved out of alignment with said slide member housing orifice thereby blocking communication of bleed fluid to said main chamber, said bias means comprising a tension spring and further comprising means for supporting one end of said spring in a generally stationary position relative to said slide member housing and means for connecting the opposite end of said spring to said slide member.

12. The apparatus of claim 11 further comprising means for adjusting said generally stationary position of said one end of the spring thereby to adjust the tension of said spring.

13. The apparatus of claim 12 further comprising a swivel interposed between said spring and one of said slide member and slide member housing to eliminate twisting of said spring.

14. A bleed control apparatus for a fluid conveying system including a main conduit having a sidewall, inlet end, outlet end and a bleed opening and slide member slot through said sidewall, said apparatus comprising,
 a slide member housing mounted on said main conduit at said slide member slot and defining a bleed orifice therethrough,
 a slide member slidably supported in said housing and having a forward end extending into said main conduit through said slide member slot, an opposite rearward end and a bleed orifice alignable with said housing bleed orifice,
 means for establishing fluid communication between said housing bleed orifice and said main conduit bleed opening upon alignment of the slide member bleed orifice with the housing bleed orifice,
 bias means urging said slide member in one direction toward a position of alignment of the slide member bleed orifice with the housing bleed orifice, and
 an air foil mounted on the forward end of said slide member within said main conduit and inclined relative to the axis of said main conduit such that fluid flow through said main conduit impinges on said air foil to urge said slide member in the opposite direction toward a position wherein said slide member orifice is moved out of alignment with said slide member housing orifice thereby blocking communication of bleed fluid to said main chamber,
 said means for establishing fluid communication between said housing bleed orifice and said main conduit bleed opening comprising a cabinet mounted on said main conduit and enclosing said slide member housing and main conduit bleed opening,
 said cabinet including an access door through which said slide member and housing may be inserted and removed.

15. The apparatus of claim 14 wherein said slide member slot opens into said main conduit bleed opening within said cabinet whereby said air foil is insertable into and removable from said main conduit through said main conduit bleed orifice.

* * * * *